May 3, 1927.

L. H. PIETZSCH 1,627,115

LIQUID DISPENSING APPARATUS

Filed March 11, 1927

Inventor
L. H. Pietzsch
by Jno. Fawcie Atty.

May 3, 1927.

L. H. PIETZSCH

1,627,115

LIQUID DISPENSING APPARATUS

Filed March 11, 1927     4 Sheets-Sheet 4

Inventor
L. H. Pietzsch

Patented May 3, 1927.

1,627,115

UNITED STATES PATENT OFFICE.

LOUIS HENRI PIETZSCH, OF COBURG, MELBOURNE, VICTORIA, AUSTRALIA.

LIQUID-DISPENSING APPARATUS.

Application filed March 11, 1927, Serial No. 174,644, and in Australia December 18, 1925.

This invention relates to apparatus for measuring and dispensing petrol and other liquids wherein the liquid is pumped from a storage tank or reservoir to an elevated measuring chamber from which the desired measured quantity is delivered by gravity.

More particularly the invention refers to machines of the class indicated whereby two or more different grades, brands or species of liquid may be measured and delivered from the same apparatus or installation without mixing or contamination of the respective liquids during the passage thereof from the respective storage tanks or reservoirs to the common measuring chamber and delivery of the measured quantity from said chamber.

One of the objects of the invention is to provide an improved machine of the above mentioned type whereby mixing of the different liquids is positively prevented and a highly efficient and reliable apparatus is provided.

Another object of the invention is to provide certain improvements in liquid measuring and dispensing machines whether adapted for measuring and dispensing a single liquid or species of liquid or a plurality of different grades or species as above mentioned.

The various features of the invention will however, be more fully set forth and defined in the following description and the appended claims.

Referring to the drawings which form part of this specification:—

The invention may be applied to an installation embodying the usual elevated measuring chamber $2^a$ which may be constructed of glass or provided with an observation window and is mounted upon a suitable stand or supporting frame $3^a$ carrying casings $4^a$ and $5^a$ which enclose various parts of the apparatus beneath the measuring chamber $2^a$.

One or more pumps 6 of any suitable construction may be employed the number of pumps depending upon the number of liquids of species of liquids to be raised into the elevated measuring chamber. The pumps are preferably arranged within the lower part of the frame or stand $3^a$ as shown but may, if desired, be installed at a distance from the measuring chamber, as for example within or adjacent a garage or like building with which the apparatus is associated. In either case the pumps may be operated either manually or by power, in the former case operating handles $6^a$ being provided outside the casings $4^a$, $5^a$.

Figure 1:
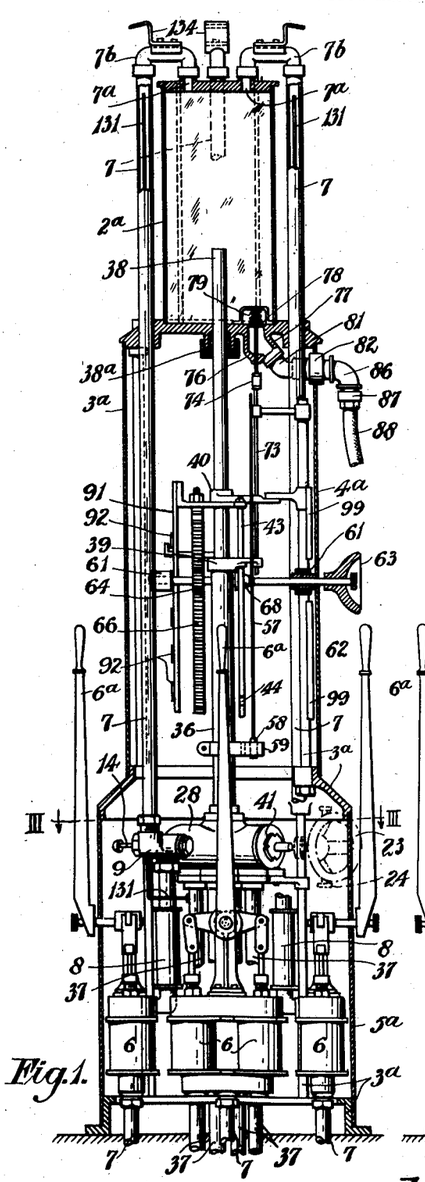
Figure 1 is a part sectional side elevation of apparatus according to this invention.

A supply pipe 7 leads to each pump from an underground or other storage tank not shown, a separate and independent storage tank or reservoir being provided for each supply pipe which passes upwardly from the respective pump to the measuring chamber $2^a$ and is preferably fitted adjacent the pump with a suitable filter 8 (Fig. 1). Each supply pipe 7 is adapted to deliver its respective liquid into the measuring chamber 2ª either at the top thereof by way of inlet ports 7ª, as indicated in the drawings, or through the bottom of said chamber as desired.

Figure 3:
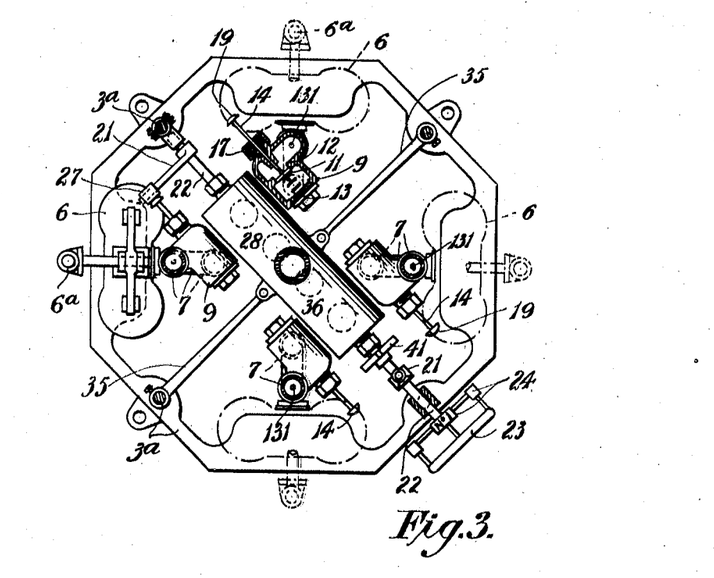
Figure 3 is a cross sectional plan on a larger scale, taken approximately on the line III—III in Figure 1.

Interposed in each supply pipe between its upper or delivery end and the respective pump is an inlet valve casing 9 accommodating an inlet valve 11 (Fig. 3) which is normally held against a seating 12 by means of a spring 13 to thereby cut off the supply of liquid through the respective supply pipe to the measuring chamber. The stem 14 of each inlet valve passes slidably through a gland 17 of the valve casing and is provided at its outer end with a domed or like head 19.

Figure 2:
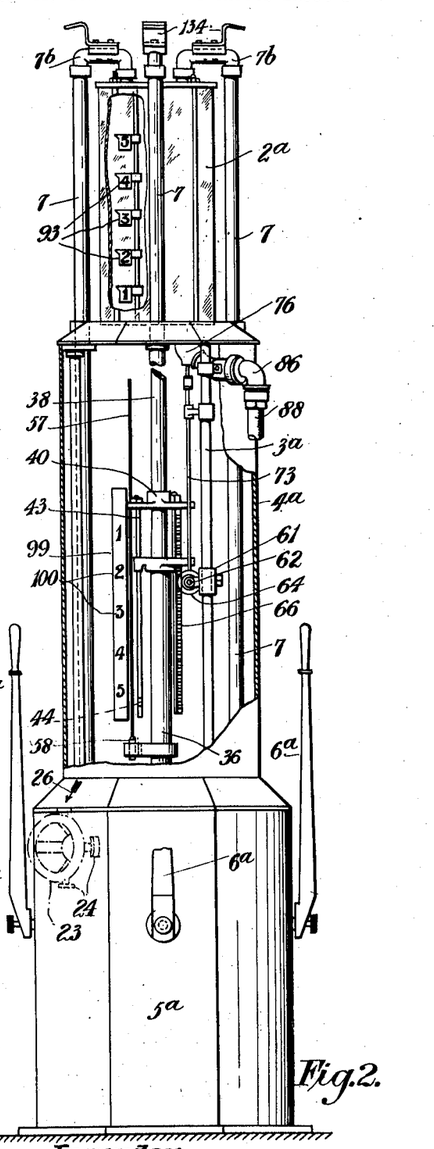
Figure 2 is a part sectional front view of the apparatus.

The inlet valve 11 are operated by means of tappet arms or cams 21 on a transverse spindle 22 which carries at one end an operating hand wheel or the like 23, and indicating members 24 each of which bears an indicating character or mark denoting the respective liquid which is supplied to the measuring chamber when the particular indicating member 24 is brought into register with a stationary indicating mark 26 on the frame of the machine as seen in Figure 2. Two of the tappet arms or cams 21 are mounted on the spindle in suitable radial positions, each of said arms or cams being adapted to selectively engage the heads 19 of two opposite inlet valve stems 14 so that only one of said inlet valves may be opened at any one time according to the position of the hand wheel 23 and the tappet arms or cams 21. Each of these arms is preferably provided at its outer end with a roller 27 to engage the heads 19 of the inlet valve spindles. It will be evident from the foregoing that only one liquid or species of liquid may be supplied to the measuring chamber at any one time.

The spindle 22 also carries a distributary drain valve 28 which may include a cylindrical valve casing 31 accommodating a cylindrical valve 32, said casing and valve being provided with outlet ports 33, 34. The valve casing also has an inlet port 33ª and the valve a series of circumferentially spaced inlet ports 34ª whereby a liquid draining back from the measuring chamber through a stationary return pipe 36 and into the interior of the drain valve 32 may be returned to its proper storage tank by way of drain pipes 37 which lead from the valve casing 31 to the various storage tanks and thus convey the different liquids back to their respective tanks without mixing. The drain valve casing may be supported by arms 35 (Fig. 3) which are suitably secured at their outer ends to the framework 3ª.

Extending into the measuring chamber 2ª is a vertically adjustable overflow tube 38 which passes slidably through a liquid tight gland 38ª at the bottom of the measuring chamber. This vertically slidable tube permits the excess liquid to escape from the measuring chamber when charging the latter, and also functions to measure the quantity of liquid retained within the measuring chamber according to the position of said tube, and to drain any surplus liquid from the measuring chamber to the distributary drain valve and thence back to the proper storage tank by way of the drain pipes 37 when the sliding tube is lowered. The lower end of the sliding tube is adapted to telescope within the stationary return pipe 36, suitable means such as a gland 39 being provided to form a liquid tight joint between the two tubes. It will be evident from the foregoing that when one of the inlet valves 11 is open to permit the desired liquid to pass into the measuring chamber the corresponding ports of the distributary drain valve 32 will at the same time be opened to permit the surplus liquid passing from the measuring chamber through the sliding overflow tube 38 to return to its proper storage tank by way of the appropriate drain pipe 37.

In order to prevent the distributary drain valve from being operated until the overflow tube has been moved to its lowermost position and has thus drained all liquid from the bottom of the measuring chamber, a suitable interlocking mechanism is provided. This interlocking mechanism preferably comprises a notched wheel 41 which is fixed to the distributary drain valve spindle 22 and is provided in its periphery with a series of circumferentially spaced notches or pockets 42, said notches being of substantially V shape and corresponding in number with the number of pumps 6 and supply pipes 7 with which the machine is fitted. The notches 42 are also suitably positioned to coincide with the outlet ports 34 in the distributary drain valve 32, the inlet ports 34ª of which are so arranged that an inlet port will register with the inlet port 33ª of the valve casing at every fixed position of the valve, 32.

Figures 12, 13, 14, 15, 16:
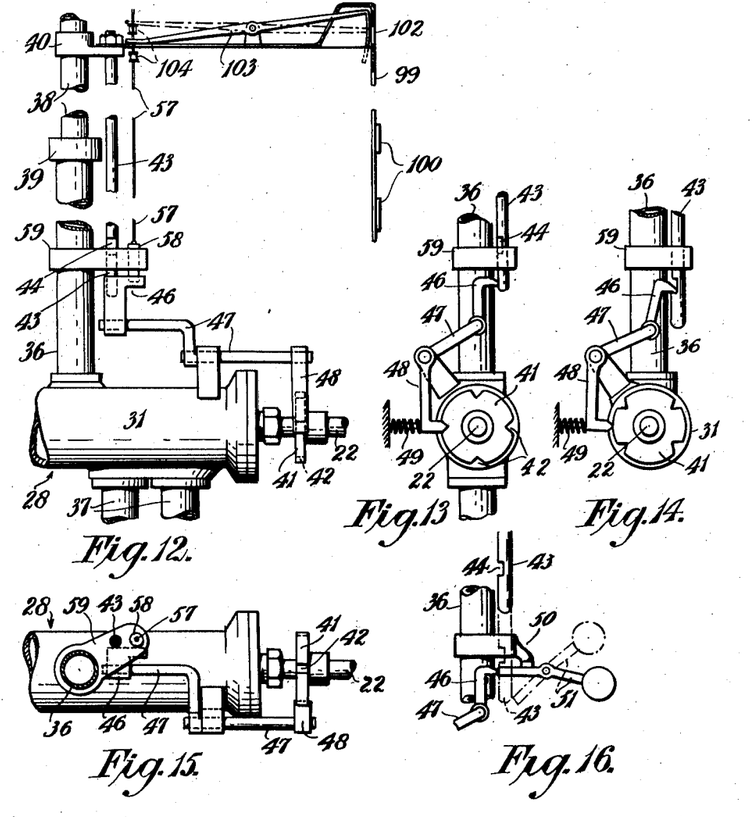
Figure 12 is a broken view in elevation of interlocking mechanism for preventing fraudulent manipulation of the apparatus.
Figure 13 is a side view of certain parts of the mechanism seen in Figure 12.
Figure 14 is a view similar to Figure 13 but showing the interlocking mechanism in another position.
Figure 15 is a plan of the parts seen in the lower portion of Figure 12.
Figure 16 is a fragmentary side view of the interlocking mechanism incorporating a supplementary locking device.

Suitably secured to a bracket 40 on, and moving with, the sliding overflow tube 38 is a vertical stop bar 43 having near its lower end a recess 44 which is adapted, when the overflow tube and the bar 43 are in their lowest or draining position, to accommodate the projecting end of a locking lever or pawl 46 (see Figs. 12 to 15). This locking lever is pivotally connected by an arm or link 47 with a second locking lever or pawl 48 the projecting end of which is adapted to enter the notches 42 in the wheel 41, and is normally pressed into such notches by means of a spring 49 as indicated in Figures 13 and 14. It will thus be seen that the spindle 22 carrying the distributary drain valve, and the arms or cams 21, are normally locked against rotation by means of the locking lever 48 engaging one of the notches on the wheel 41 so that the drain valve and inlet valves 11 can only be operated when the overflow tube 38 and the stop bar 43 are in their lowermost position where the locking lever 46 is permitted to enter the recess 44 in the said stop bar and the second locking lever 48 is thus free to disengage from the respective notch of the wheel 41 consequently allowing the latter to be turned with the spindle 22 so as to open any desired inlet valve and a corresponding port of the distributary drain valve. By this means the inlet and drain valves can be operated only when the sliding overflow tube is at its lowest position.

Figure 17:
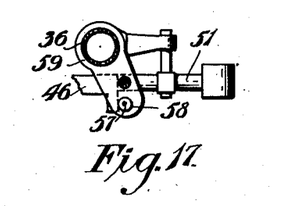
Figure 17 is a plan of Figure 16.

In order to permit a relatively short stop bar 43 to be employed so that the lowering of said bar will not cause it to foul any of the parts disposed beneath it, a pivoted subsidiary stop 51 (Figs. 16 and 17) may be employed. This pivoted stop may be weighted so as to operate by gravity and normally lies in the path of the locking lever or pawl 46 as indicated by broken lines in Figure 16, thus preventing forward movement of this locking lever so as to release the other locking lever 48 from the notches in the wheel 41. When, however, the vertically moving stop bar 43 descends with the overflow tube it forces the pivoted stop 51 out of the way of the locking lever 46 as indicated by broken lines in Figure 16 thus permitting this locking lever to enter the recess 44 in the stop bar 43 so as to release the locking lever 48 from the respective notch of the wheel 41 when the latter is turned by means of the hand wheel 23. A fixed stop 50 may be provided to limit the gravity swinging of the pivoted stop 51.

Figure 9:
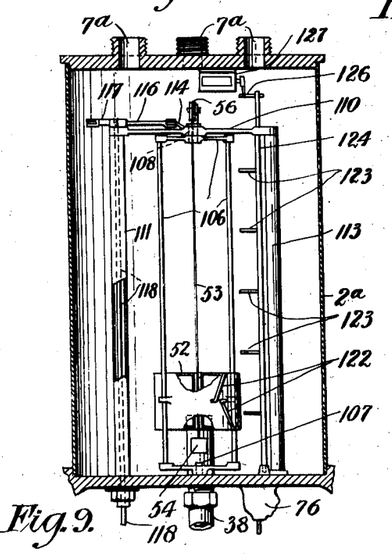
Figure 9 is a vertical section of the measuring chamber showing counting mechanism adapted to record the amount of liquid dispensed from the chamber.
Figure 10:
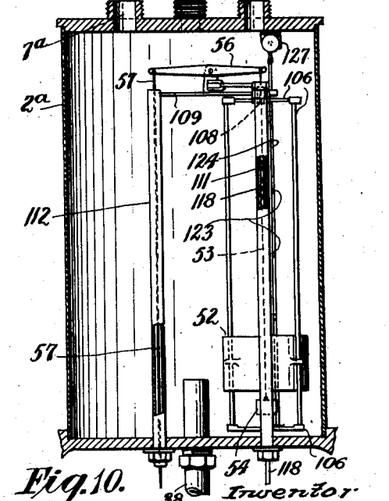
Figure 10 is a vertical section of the measuring chamber and internal parts in a plane at right angles to that of Figure 9.

In order to prevent fraudulent manipulation of the inlet and drain valves by lowering the overflow tube and the stop bar 43 so as to release the interlocking gear whereby the spindle 22 may be turned, and then quickly returning the overflow tube to an elevated position thus permitting the liquid within the measuring chamber to be drained back to the storage tank of a different liquid, I employ a secondary locking device which positively prevents manipulation of the inlet and drain valves until the measuring chamber is empty. This secondary locking device comprises a float 52 (Figs. 9 to 11) which is disposed within the measuring chamber and is adapted to move vertically along a rod or line 53 which passes through a vertical passage in the float. This rod or line carries at its lower end a disc or stop 54 and is attached at its upper end to one end of an intermediately pivoted balance lever 56 which is suitably supported adjacent the top of the measuring chamber. To the other end of this balance lever is attached the upper end of a rod or line 57 which carries at its lower end a sliding stop or plunger 58 (Figs. 1, 12 and 15). This plunger is adapted to move vertically within a guide 59 which also slidably accommodates the vertically moving stop bar 43. The plunger or stop 58 is normally disposed in the path of the locking lever 46 beside the stop bar 43 as indicated in Figs. 12 and 15, thus positively preventing forward movement of the locking lever 46 and consequent disengagement of the second locking lever 48 from the notches in the wheel 41. When, however, the measuring chamber empties and the float 52 consequently falls and engages the stop or disc 54, the additional weight of the float on the line or rod 53 overcomes the weight of the plunger 58 and consequently raises the latter out of the path of the pawl 46 thereby allowing the latter to enter the recess 44 in the stop bar 43 so that the locking lever may slip out of the notches 42 in the wheel 41. The latter wheel may be thus turned with the spindle 22 to operate the inlet and drain valves as previously mentioned.

Mounted to turn and slide in bearings 61 which may be carried by the machine frame 3ª is a horizontal shaft 62 (Figs. 1, 2, 6, 7, 8) carrying at one end an operating hand wheel or the like 63. This shaft carries a toothed pinion 64 engaging a rack 66 which may be attached by the bracket 40 to the vertically sliding overflow tube 38 whereby the latter may be raised and lowered by operation of the hand wheel 63.

This shaft 62 also carries a cone 68 which converges lengthwise of the shaft 62 in the direction of the hand wheel 63. This cone is adapted to engage the lower end of a vertically sliding rod 73 which may, if desired, be provided with a turn buckle 74 whereby its length may be adjusted. The upper end of this rod may pass through a gland at the bottom of a serve valve or discharge valve casing 76 disposed at the bottom of the measuring chamber 2ª around a discharge opening therein as seen in Fig. 1. This discharge opening is controlled by a serve or discharge valve 78 which may be actuated by a spring 79 to normally close the said discharge opening. The serve valve 78 is preferably of the mushroom type and is adapted to be raised and lowered with the vertically sliding rod 73 whereby the serve valve 78 is opened when the shaft 62 is pulled outwardly thus engaging the cone 68 with the lower end of the rod 73 and consequently raising the latter and opening the serve valve.

Figure 5:
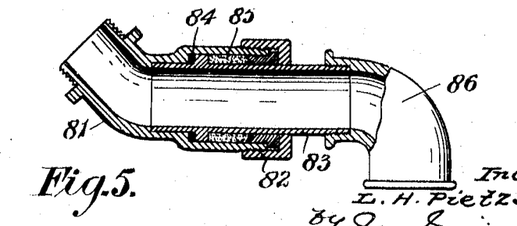
Figure 5 is a longitudinal section of a swivel connection between a liquid serve valve casing and a discharge tube.

The serve valve casing is provided with a diagonally disposed branch 77 which is threaded to engage the inner end of a socket 81 (see Fig. 5) the outer end of which is provided with a gland 82 through which passes a swivelling tube 83. This swivelling tube passes outwardly through an opening in the casing 4ª. Fitted to the outer end of the swivelling tube 83 is an elbow 86 which is adapted for connection as at 87 (Fig. 1) to the flexible discharge hose 88 through which the liquid is discharged from the measuring chamber. It will be evident that the swivelling tube permits the said elbow and the discharge hose to be moved in any desired direction relative to the socket 81. The numerals 84, 85 are employed in Figure 5 to indicate a washer and suitable packing inserted between the swivelling tube and the socket and gland.

Figure 6:
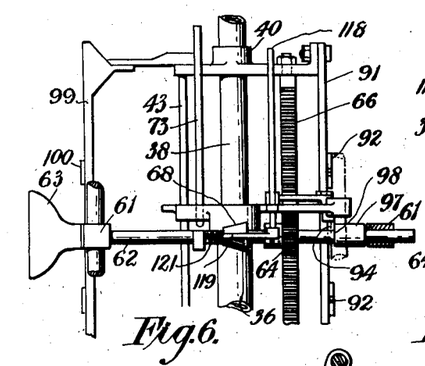
Figure 6 is a fragmentary side view of mechanism for actuating a measuring and overflow tube, a serve valve and certain co-related parts.
Figure 7:
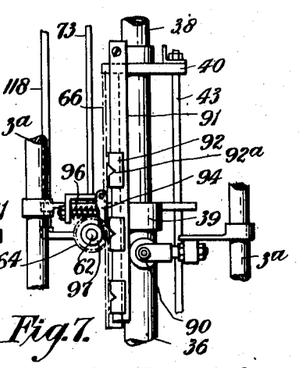
Figure 7 is a view looking at the left hand side of Figure 6.
Figures 8, 11:
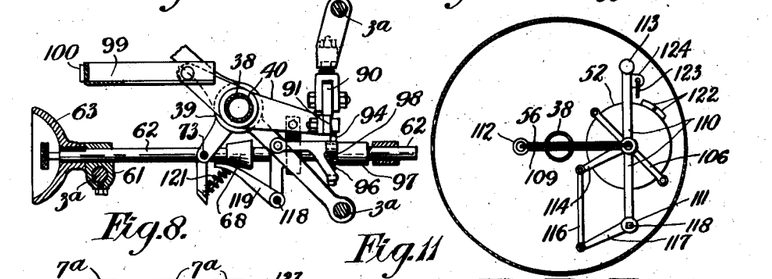
Figure 8 is a plan of Figure 6.
Figure 11 is a plan of Figure 10.

Attached at its upper end to the bracket 40 and moving vertically with the overflow tube 38 is a bar 91 (Figs. 1, 6 and 7) carrying notched plates 92 which are so spaced along the bar 91 that the distances between the notches 92ª in said plates correspond to predetermined measures, such as gallons, in accordance with the markings on the usual indicator 93 (Fig. 2) within the measuring chamber 2ª. The notches 92ª of the bar 91 are substantially V shaped and are adapted for engagement by the similarly shaped end of a pivoted catch or pawl 94 which is pressed into the notches by means of a spring 96, (Figs. 6, 7 and 8). Attached to the rotatable and sliding shaft 62 adjacent the catch 94 is a collar or enlargement 97. When the catch 94 is engaged with one of the notches of the bar 91 and the upper end of the sliding overflow tube is consequently disposed at one of its proper predetermined measuring positions, the collar or enlargement 97 on the shaft 62 is free to move past said catch so that the serve valve 78 may be opened by the engagement of the cone 68 with the lower end of the rod 73 as previously mentioned. In this position the pinion 64 is disengaged from the rack 66 so that the overflow tube cannot be moved whilst the serve valve is open. Whilst said serve valve is open and the liquid is thus being delivered from the measuring chamber, the collar 97 also prevents the catch 94 from being disengaged from the respective notch of bar 91 so that the overflow tube is positively locked at the desired measuring position whilst serving liquid from the measuring chamber. When, however, the sliding and rotatable shaft 62 is pushed back to engage the pinion 64 with the rack 66 it disengages the cone 68 from the rod 73 thus closing the serve valve. In this position the front end 98 of collar 97 is moved past the catch 94 as shown in Figs. 6 and 8, so that when the shaft 62 is again turned to operate the rack 66 and thus move the overflow tube and the notched bar 91 into another predetermined measuring position in accordance with the spacing of the notches of the bar 91, the catch 94 is free to disengage from the respective notch when the bar 91 moves vertically and the catch is thus forced outwardly by the inclined side of the respective notch. It will be evident that by this means the serving of liquid from the measuring chamber can only be effected when the catch 94 is engaged with one of the notches of the bar 91. Consequently no serving of the liquid from the measuring chamber 2ª can take place with the overflow tube and the notched bar 91 in any intermediate position between the proper predetermined measuring positions. A roller 90 suitably supported from the frame 3ª may be provided to guide the notched bar 91 in its vertical movement.

Figure 18:
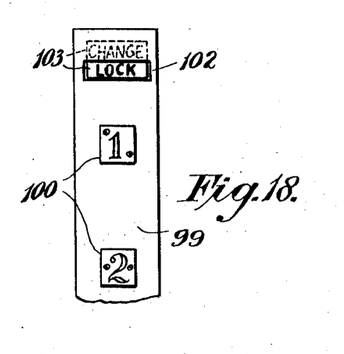
Figure 18 is an enlarged fragmentary front view of an indicating bar.

Attached to the bracket 40 is an indicating bar 99 (Figs. 1, 2, 6, 8, 12 and 18) having indicating numbers 100 spaced vertically thereon in accordance with the vertical spacing of the notches in the bar 91. This indicating bar moves vertically behind an opening or window (not shown) in the casing 4ª. As the indicating bar 99 moves vertically with the sliding overflow tube, the position of the latter in accordance with the desired measure is indicated by the numbers 100 appearing through the said window or opening. The indicating bar is also preferably provided adjacent its upper end with an aperture or window 102 (Figs. 12 and 18) behind which and carried by the bar 99, is a pivoted indicator arm 103 bearing words such as "Change" and "Lock" as seen in Fig. 18. Normally the word "Lock" appears through the window 102 and the said window of the casing 4ª thus denoting that the interlocking mechanism previously described is in position to lock the inlet valves 11 and the distributary drain valve 28 against manipulation. When however, the measuring chamber 2ª empties a striker 104 on the float operated line or rod 57 (which is automatically raised by the action of the float 52 and associated stop 54 as before mentioned) shifts the pivoted indicator arm 103 so that it displays the word "Change" through the said co-aligned windows thus indicating that the inlet and drain valves may if required, be moved by the operating hand wheel 23 to another position to measure and deliver a different liquid. The raising of the line or rod 57 also lifts the plunger 58 clear of the aforesaid lock lever 46. One end of the pivoted indicator may be apertured or forked to freely pass the line 57 and to provide a striking surface for the striker 104.

The float 52 is mounted to rise and fall upon a frame 106 (which may comprise uprights and lower and upper cross bars) disposed within the measuring chamber 2ª. The float is adapted to turn bodily with this frame, for a purpose hereinafter explained, about lower and upper vertical trunnions 107, 108. The lower trunnion 107 may upstand from the base of the measuring chamber whilst the upper trunnion 108 may be mounted at the junction of arms 109, 110, of a T shaped member supported in a horizontal plane near the top of the measuring chamber by standards 111, 112, 113 which are suitably secured to the base of the chamber. The said upper trunnion may be hollow to freely pass the aforesaid rod or line 53. The swivelling movement of the frame 106 and float is effected through the medium of an arm 114 outstanding from the upper cross bar of said frame 106 and connected by a link 116 with a rocker arm 117 fixed to the upper end of a rod 118 which passes downwardly out of the base of the measuring chamber, the upper portion of this rod being freely accommodated by the standard 111 which is hollow as shown in the drawings. The lower end of the rod 118 has another rocker arm 119 (see Figs. 6, 7 and 8) which is pressed by a spring 121 against the aforesaid cone 68 on the rotary and slidable spindle 62. Carried by the float 52 are oppositely inclined fins or projections 122 which, when the serve valve 78 is open to discharge the liquid from the measuring chamber, are adapted to engage vertically spaced pins 123 on a vertical rocking spindle 124 which is disposed within the measuring chamber and is provided at its upper end with an arm 126 adapted to operate a meter or counter 127, whereby the aggregate measured quantity of liquid delivered from the measuring chamber by way of the serve valve and the discharge hose 88 is recorded. When the serve valve is opened the cone 68 upon the shaft 62 swings the spring pressed rocker arm 119 outwardly and, through the medium of the vertical rod 118 and the associated rocker arm 117 and link 116, causes the float to be turned into such a position that the fins 122 upon the float are disposed in the path of and successively operate the pins 123 upon the vertical spindle 124 which is thus rocked from side to side to operate the counter or meter 127. When, however, the serve valve 78 is closed and the cone 68 is retracted from the rocker arm 119 the spring associated with the latter causes the frame 106 and the float 52 to be swung about their trunnions 107, 108, so that the fins on the float are disposed out of the path of the pins 123 and consequently the rising and falling of the float does not actuate the meter.

The aforesaid rod or line 57 attached to the balance lever 56 and carrying the plunger 58 may pass freely through the hollow standard 112 within the measuring chamber, the top of this standard, and also that of the hollow standard 111 before referred to, being disposed above the level to which the liquid is pumped into the measuring chamber for dispensing the greatest volume. Consequently there is no possibility of the liquid escaping from the measuring chamber through said hollow standards.

Figure 4:
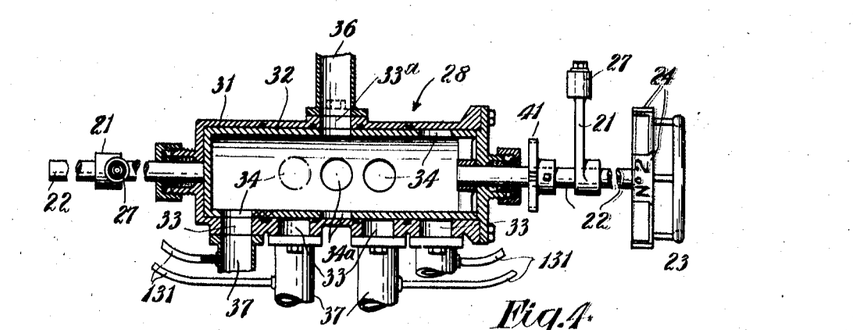
Figure 4 is a longitudinal section of a distributary drain valve and associated parts.

It will be evident that the supply pipes 7 will remain filled with liquid up to approximately the bend 7$^b$ where they enter the measuring chamber. In order to prevent such liquid from dripping into the measuring chamber, owing to expansion of the liquid which may result from relatively high temperature, a small return tube 131 may extend downwardly and preferably within each supply pipe from a point at a suitable distance below the bend 7$^b$, these return tubes passing out of the inlet valve casings 9 and being connected at their lower ends to the respective drain pipes 37, as indicated in Figs. 1 and 4, so that the liquid cannot rise beyond the open tops of the return tubes except when the pumps 6 are being operated, but will return through said tubes to the respective storage tanks by way of the appropriate drain pipes 37.

It will be evident from the foregoing that various features of the invention, such, for instance, as the sliding and rotatable shaft 62 and the associated parts for operating the serve valve 78 and the rack 66 and for engaging the notched bar 91, as well as the mechanism for recording the quantity of liquid served from the measuring chamber and for rendering such recording mechanism inoperative, are equally applicable to machines for measuring and dispensing either a single liquid or a plurality of different liquids or species thereof. It will also be evident that in applying the invention to machines for measuring and dispensing a single grade or species of liquid only a single pump 6 and supply pipe 7 is necessary and that various parts, such as the interlocking mechanism, the distributary drain valve and the various inlet valves and other parts required for the measuring and dispensing of various different liquids, may be eliminated.

The apparatus may be fitted with any suitable top which may be illuminated and bear suitable signs, and such top may be supported by brackets 134 attached to the bends 7$^b$ at the upper ends of the supply pipes 7.

Having now described my invention what I claim as new and desire to secure by Letters Patent is:—

1. In apparatus for measuring and dispensing petrol and other liquids the combination of a measuring chamber, a series of independent liquid supply pipes passing to said chamber, an inlet valve in each supply pipe for separately controlling the admission of liquid through each of said supply pipes to the measuring chamber, a vertically adjustable overflow tube passing into said chamber, a distributary drain valve connected with said overflow tube, a series of drain pipes leading from said drain valve, and means for selectively operating said inlet and drain valves whereby a corresponding supply pipe and drain pipe may be simultaneously opened to the measuring chamber to the exclusion of the other of said pipes for the purpose specified.

2. In apparatus for measuring and dispensing petrol and other liquids the combination of a measuring chamber, a series of independent liquid supply pipes passing to said chamber, an inlet valve in each supply pipe for separately controlling the admission of liquid through each of said supply pipes to the measuring chamber, a vertically adjustable overflow tube passing into said chamber, a distributary drain valve connected with said overflow tube, a series of drain pipes leading from said drain valve, an operating spindle to said drain valve, and means carried by said spindle for selectively opening said inlet valves whereby a corresponding supply pipe and drain pipe may be simultaneously opened to the measuring chamber to the exclusion of the other of said pipes, for the purpose specified.

3. In apparatus for measuring and dispensing petrol and other liquids the combination of a measuring chamber, a series of independent liquid supply pipes passing to said chamber, an inlet valve in each supply pipe for separately controlling the admission of liquid through each of said supply pipes to the measuring chamber, a vertically adjustable overflow tube passing into said chamber, a distributary drain valve connected with said overflow tube, a series of drain pipes leading from said drain valve, an operating spindle to the said drain valve, and tappet arms or cams mounted on said spindle and adapted to selectively and independently open said inlet valves according to the circumferential position of said spindle whereby a corresponding supply pipe and drain pipe may be simultaneously opened to the measuring chamber to the exclusion of the other of said pipes, for the purpose specified.

4. In apparatus for measuring and dispensing petrol and other liquids, the combination of a measuring chamber, a series of independent liquid supply pipes passing to said chamber, valve casings interposed in said supply pipes, an inlet valve mounted within each of said casings to separately control the admission of liquid through each of said supply pipes to the measuring chamber, said inlet valves having sliding stems projecting outwardly through said casings, a vertically adjustable overflow tube passing into said chamber, a distributary drain valve connected with said overflow tube, a series of drain pipes leading from said drain valve, and tappet arms or cams movable with said drain valve and adapted to engage the outer ends of said sliding valve stems whereby said inlet and drain valves may be selectively operated to simultaneously open a corresponding supply pipe and drain pipe to the measuring chamber to the exclusion of the other of said pipes, for the purpose specified.

5. In apparatus for measuring and dispensing petrol and other liquids the combination of a measuring chamber, a series of independent liquid supply pipes passing to said chamber, an inlet valve in each supply pipe for separately controlling the admission of liquid through each of said supply pipes to the measuring chamber, a vertically adjustable overflow tube passing into said chamber, a stationary return pipe connected with said overflow tube which is adapted to telescope in relation to said return pipe, a distributary drain valve connected to the lower end of said return pipe, a series of drain pipes leading from said drain valve, and means for selectively operating said inlet and drain valves whereby a corresponding supply pipe and drain pipe may be simultaneously opened, to the measuring chamber to the exclusion of the other of said pipes, for the purpose specified.

6. In apparatus for measuring and dispensing petrol and other liquids the combination of a measuring chamber, a series of independent liquid supply pipes passing to said chamber, an inlet valve in each supply pipe for separately controlling the admission of liquid through each of said supply pipes to the measuring chamber, a vertically adjustable overflow tube passing into said chamber, a distributary drain valve connected with said overflow tube, said drain valve comprising a cylindrical casing having at its top an inlet port connected with said overflow tube, a series of outlet ports to said casing, a drain pipe leading from each of said outlet ports, a cylindrical ported valve rotatable within said casing, a spindle projecting from each end of said cylindrical valve, and tappet arms or cams carried by opposite end portions of said spindle to selectively open said inlet valves in accordance with the circumferential position of the said cylindrical drain valve, for the purpose specified.

7. In apparatus for measuring and dispensing petrol and other liquids, the combination of a measuring chamber, a series of independent liquid supply pipes passing to said chamber, an inlet valve in each supply pipe for separately controlling the admission of liquid through each of the said supply pipes to the measuring chamber, a vertically adjustable overflow tube passing into said chamber, a distributary drain valve connected with said overflow tube, a series of drain pipes leading from said drain valmeans for selectively operating said inlet and drain valves whereby a corresponding supply pipe and drain pipe may be simultaneously opened to the measuring chamber to the exclusion of the other of said pipes, and interlocking means adapted to lock said inlet and drain valves against operation except when the vertically adjustable overflow tube is at its lowermost position in the measuring chamber, for the purpose specified.

8. In apparatus for measuring and dispensing petrol and other liquids, the combination of a measuring chamber, a series of independent liquid supply pipes passing to said chamber, an inlet valve in each supply pipe for separately controlling the admission of liquid through each of said supply pipes to the measuring chamber, a vertically adjustable overflow tube passing into said chamber, a distributary drain valve connected with said overflow tube, a series of drain pipes leading from said drain valve, means for selectively operating said inlet and drain valves whereby a corresponding supply pipe and drain pipe may be simultaneously opened to the measuring chamber to the exclusion of the other of said pipes, and interlocking means adapted to lock said inlet and drain valves against operation except when the vertically adjustable overflow tube is at its lowermost position in the measuring chamber, said interlocking means comprising a notched wheel which is adapted to turn with the distributary drain valve, a vertical stop bar which moves with the adjustable overflow tube, and means interposed between said stop bar and said notched wheel whereby the latter is locked against rotation except when said bar is in its lowermost position, for the purpose specified.

9. In apparatus for measuring and dispensing petrol and other liquids, the combination of a measuring chamber, a series of independent liquid supply pipes passing to said chamber, an inlet valve in each supply pipe for separately controlling the admission of liquid through each of said supply pipes to the measuring chamber, a vertically adjustable overflow tube passing into said chamber, a distributary drain valve connected with said overflow tube, a series of drain pipes leading from said drain valve, means for selectively operating said inlet and drain valves whereby a corresponding supply pipe and drain pipe may be simultaneously opened to the measuring chamber to the exclusion of the other of said pipes, and interlocking means adapted to lock said inlet and drain valves against operation except when the vertically adjustable overflow tube is at its lowermost position in the measuring chamber, said interlocking means comprising a notched wheel which is adapted to turn with the distributary drain valve, a vertical stop bar which moves with the adjustable overflow tube, a first locking lever or pawl adapted to engage said stop bar, a second locking lever or pawl adapted to engage the notches of said wheel, and means operatively connecting said locking levers whereby said notched wheel is locked against rotation except when said bar is in its lowermost position, for the purpose specified.

10. In apparatus for measuring and dispensing petrol and other liquids, the combination of a measuring chamber, a series of independent liquid supply pipes passing to said chamber, an inlet valve in each supply pipe for separately controlling the admission of liquid through each of said supply pipes to the measuring chamber, a vertically adjustable overflow tube passing into said chamber, a distributary drain valve connected with said overflow tube, a series of drain pipes leading from said drain valve, means for selectively operating said inlet and drain valves whereby a corresponding supply pipe and drain pipe may be simultaneously opened to the measuring chamber to the exclusion of the other of said pipes, and interlocking means adapted to lock said inlet and drain valves against operation except when the vertically adjustable overflow tube is at its lowermost position in the measuring chamber, said interlocking means comprising a notched wheel which is adapted to turn with the distributary drain valve, a vertical stop bar which moves with the adjustable overflow tube, a recess formed in said stop bar adjacent its lower end, a first locking lever or pawl adapted to enter said recess when said stop bar is in its lowest position, a second locking lever or pawl adapted to engage the notches of said wheel, and means operatively connecting said locking levers whereby said notched wheel is locked against rotation except when the first locking lever is engaging said recess, for the purpose specified.

11. In apparatus for measuring and dispensing petrol and other liquids, the combination of a measuring chamber, a series of independent liquid supply pipes passing to said chamber, an inlet valve in each supply pipe for separately controlling the admission of liquid through each of said supply pipes to the measuring chamber, a vertically adjustable overflow tube passing into said chamber, a distributary drain valve connected with said overflow tube, a series of drain pipes leading from said drain valve, means for selectively operating said inlet and drain valves whereby a corresponding supply pipe and drain pipe may be simultaneously opened to the measuring chamber to the exclusion of the other of said pipes, and interlocking means adapted to lock said inlet and drain valves against operation except when the vertically adjustable overflow tube is at its lowermost position in the measuring chamber, said interlocking means comprising a notched wheel which is adapted to turn with the distributary drain valve, a vertical stop bar which moves with the adjustable overflow tube, means interposed between said stop bar and said notched wheel whereby the latter is locked against rotation except when said bar is in its lowermost position, and a pivoted stop adapted to engage the lower end of said stop bar and to prevent turning of said notched wheel when the overflow tube is in a raised position, for the purpose specified.

12. In apparatus for measuring and dispensing petrol and other liquids, the combination of a measuring chamber, a series of independent liquid supply pipes passing to said chamber, an inlet valve in each supply pipe for separately controlling the admission of liquid through each of said supply pipes to the measuring chamber, a vertically adjustable overflow tube passing into said chamber, a distributary drain valve connected with said overflow tube, a series of drain pipes leading from said drain valve, means for selectively operating said inlet and drain valves whereby a corresponding supply pipe and drain pipe may be simultaneously opened to the measuring chamber to the exclusion of the other of said pipes, a float within said measuring chamber, and interlocking means controlled by said float to lock said inlet and drain valves against operation except when said float is at its lowest position within the measuring chamber, for the purpose specified.

13. In apparatus for measuring and dispensing petrol and other liquids, the combination of a measuring chamber, a series of independent liquid supply pipes passing to said chamber, an inlet valve in each supply pipe for separately controlling the admission of liquid through each of said supply pipes to the measuring chamber, a vertically adjustable overflow tube passing into said chamber, a distributary drain valve connected with said overflow tube, a series of drain pipes leading from said drain valve, means for selectively operating said inlet and drain valves whereby a corresponding supply pipe and drain pipe may be simultaneously opened to the measuring chamber to the exclusion of the other of said pipes, a float within the measuring chamber, interlocking means controlled by said float and adapted to lock said inlet and drain valves against operation except when the overflow tube is at its lowermost position within the measuring chamber, a balance lever connected at one end to said float, and a vertically moving stop member connected to the other end of said balance lever whereby the falling of the float raises said stop member so as to release the interlocking means and permit of the operation of said inlet and drain valves, for the purpose specified.

14. In apparatus for measuring and dispensing petrol and other liquids, the combination of a measuring chamber, a series of independent liquid supply pipes passing to said chamber, an inlet valve in each supply pipe for separately controlling the admission of liquid through each of said supply pipes to the measuring chamber, a vertically adjustable overflow tube passing into said chamber, a distributary drain valve connected with said overflow tube, a series of drain pipes leading from said drain valve, means for selectively operating said inlet and drain valves whereby a corresponding supply pipe and drain pipe may be simultaneously opened to the measuring chamber to the exclusion of the other of said pipes, interlocking means adapted to lock said separate inlet and distributary drain valves against operation except when the vertically adjustable overflow tube is at its lowermost position in the measuring chamber, said interlocking means comprising a notched wheel which is adapted to turn with the distributary drain valve, a vertical stop bar which moves with the adjustable overflow tube, a recess formed in said stop bar adjacent its lower end, a first locking lever or pawl adapted to enter said recess when said stop bar is in its lowest position, a second locking lever or pawl adapted to engage the notches in said wheel, and means operatively connecting said locking levers whereby said notched wheel is locked against rotation except when said stop bar is in its lowermost position, a secondary locking device comprising a vertically moving stop member arranged beside said stop bar and adapted to engage said first locking lever or pawl, a balance lever connected to said stop member, and a float disposed within the measuring chamber and connected to said balance lever, for the purpose specified.

15. In apparatus for measuring and dispensing petrol and other liquids, the combination of a measuring chamber, a vertically adjustable overflow tube slidable within said chamber, a rack and pinion for operating said tube, a serve or discharge valve controlling an outlet from said measuring chamber, and a slidable and rotatable shaft which is adapted for rotation to operate said overflow tube and for longitudinal or sliding movement to operate said discharge valve.

16. In apparatus for measuring and dispensing petrol and other liquids, the combination of a measuring chamber, a vertically adjustable overflow tube, slidable within said chamber, a toothed rack connected to and adapted to operate said overflow tube, a serve or discharge valve controlling an outlet from said measuring chamber, a slidable and rotatable shaft associated with said discharge valve and rack, a pinion carried by said shaft and adapted to operate said rack when the discharge valve is closed, and a member carried by said shaft and adapted to open said discharge valve as said shaft is moved longitudinally to disengage said pinion from said rack, for the purpose specified.

17. In apparatus for measuring and dispensing petrol and other liquids, the combination of a measuring chamber, a vertically adjustable overflow tube slidable within said chamber, a toothed rack connected to and adapted to operate said overflow tube, a serve or discharge valve controlling an outlet from said measuring chamber, a slidable and rotatable shaft associated with said discharge valve and rack, a pinion carried by said shaft and adapted to operate said rack when the discharge valve is closed, a rod connected with said discharge valve and a cone fitted on said slidable and rotatable shaft, said cone being adapted to engage one end of said rod whereby the discharge valve is opened when said shaft is moved longitudinally to disengage said pinion from said rack, for the purpose specified.

18. In apparatus for measuring and dispensing petrol and other liquids, the combination of a measuring chamber, a vertically adjustable overflow tube slidable within said chamber, a rack and pinion for operating said tube, a serve or discharge valve controlling an outlet from said measuring chamber, and a shaft slidable and rotatable within horizontal bearings and fitted with an operating hand wheel whereby said shaft is adapted for rotative movement to operate said overflow tube and for longitudinal sliding movement within said bearings to operate said discharge valve, for the purpose specified.

19. In apparatus for measuring and dispensing petrol and other liquids, the combination of a measuring chamber, a vertically adjustable overflow tube slidable within said chamber, a serve or discharge valve controlling an outlet from said measuring chamber, a vertical bar movable with said overflow tube and provided with vertically spaced notches corresponding to different measuring positions of said tube, a pivoted catch adapted to engage said notches, means to prevent opening of said discharge valve, except when said catch is engaged with one of said notches, a rotatable and sliding shaft, a pinion carried by said shaft, a rack operable by said pinion to vertically adjust said overflow tube, means carried by said shaft to open said discharge valve when said shaft is moved longitudinally to disengage said pinion from said rack, and means carried by said shaft to prevent disengagement of said catch from the respective notch of said bar when said shaft is in position to open the discharge valve for the purpose specified.

20. In apparatus for measuring and dispensing petrol and other liquids, the combination of a measuring chamber, a vertically adjustable overflow tube slidable within said chamber, a serve or discharge valve controlling an outlet from said measuring chamber, a vertical bar movable with said overflow tube and provided with vertically spaced notches corresponding to different measuring positions of said tube, a pivoted catch adapted to engage said notches, means to prevent opening of said discharge valve except when said catch is engaged with one of said notches, a rotatable and sliding shaft, a pinion carried by said shaft, a rack operable by said pinion to vertically adjust said overflow tube, means carried by said shaft to open said discharge valve when said shaft is moved longitudinally to disengage said pinion from said rack, and a collar or enlargement carried by said shaft and adapted to engage said pivoted catch whereby the latter is retained within the respective notch of said bar when the discharge valve is open, said collar or enlargement being also adapted to prevent longitudinal movement of said shaft to open the discharge valve except when said catch is engaged with one of said notches, for the purpose specified.

21. In apparatus for measuring and dispensing petrol and other liquids, the combination of a series of liquid storage tanks or reservoirs, a measuring chamber, a liquid supply pipe connecting each of said storage tanks with said measuring chamber, a drain pipe leading to each of said storage tanks, valve mechanism adapted for selectively placing any one of said storage tanks in communication with the common measuring chamber by way of the respective supply and drain pipes of the particular storage tank, to the exclusion of the other storage tanks, a float located within said measuring chamber and means operated by said float to prevent manipulation of said valve mechanism except when the measuring chamber is emptied of liquid, for the purpose specified.

22. In apparatus for measuring and dispensing petrol and other liquids, the combination of a series of liquid storage tanks or reservoirs, a measuring chamber, a liquid supply pipe connecting each of said storage tanks with said measuring chamber, a drain pipe leading to each of said storage tanks with said measuring chamber, a drain pipe leading to each of said storage tanks, valve mechanism adapted for selectively placing any one of said storage tanks in communication with the common measuring chamber by way of the respective supply and drain pipes of the particular storage tank to the exclusion of the other storage tanks, a float located within said measuring chamber, means operated by said float to prevent manipulation of said valve mechanism except when the measuring chamber is emptied of liquid, a vertically adjustable overflow tube passing into said measuring chamber and connected with the valve mechanism controlling said drain pipes, a vertical indicating bar carried by and moving vertically with said overflow tube, said bar having vertically spaced indicating characters, a pivoted indicating lever carried by said bar, and means controlled by the movement of the float within the measuring chamber whereby said indicating lever is automatically operated as said float falls to its lowest position, for the purpose specified.

23. In apparatus for measuring and dispensing petrol and other liquids, the combination of a measuring chamber having a serve or discharge valve, a frame or cage mounted to swing about a vertical axis within said measuring chamber, a float adapted to rise and fall on said frame or cage, a meter or counter device, a vertical rocking spindle adapted to actuate said meter or counter or successive rocking movements of said spindle, a series of vertically spaced pins or studs carried by said rocking spindle, means carried by said float to engage said studs and rock said spindle sidewardly as the float falls during discharge of the liquid from the measuring chamber by way of said discharge valve, and means adapted to automatically swing said frame or cage and said float bodily about the axis of said frame whereby the float is disposed in an inoperative position relative to said rocking spindle when said discharge valve is closed, for the purpose specified.

24. In apparatus for measuring and dispensing petrol and other liquids, the combination of a measuring chamber, having a serve or discharge valve, a frame or cage mounted to swing about a vertical axis within said measuring chamber, a float adapted to rise and fall on said frame or cage, a meter or counter device, a vertical rocking spindle adapted to actuate said meter or counter on successive rocking movements of said spindle, a series of vertically spaced pins or studs carried by said rocking spindle, means carried by said float to engage said studs and rock said spindle sidewardly as the float falls during discharge of the liquid from the measuring chamber by way of said discharge valve, means adapted to automatically swing said frame or cage and said float bodily about the axis of said frame whereby the float is disposed in an inoperative position relative to said rocking spindle when said discharge valve is closed, a vertically adjustable overflow tube passing into said measuring chamber, a slidable and rotatable shaft adapted for rotation to operate said overflow tube and for longitudinal sliding movement to operate said discharge valve, and an operative connection extending between said frame and said shaft whereby movement of the latter to close the discharge valve automatically swings said frame about its vertical axis so as to move the float into an inoperative position relative to said rocking spindle, for the purpose specified.

25. In apparatus for measuring and dispensing petrol and other liquids, the combination of a measuring chamber, having a serve or discharge valve, a frame or cage mounted to swing about a vertical axis within said measuring chamber, a float adapted to rise and fall on said frame or cage, a meter or counter device, a vertical rocking spindle adapted to actuate said meter or counter on successive rocking movements of said spindle, a series of vertically spaced pins or studs carried by said rocking spindle, means carried by said float to engage said studs and rock said spindle sidewardly as the float falls during discharge of the liquid from the measuring chamber by way of said discharge valve, means adapted to automatically swing said frame or cage and said float bodily about the axis of said frame whereby the float is disposed in an inoperative position relative to said rocking spindle when the discharge valve is closed, a vertically adjustable overflow tube extending into the measuring chamber, a toothed rack attached to and moving vertically with said overflow tube, a horizontally sliding and rotatable shaft, a pinion carried by said shaft and engaging said rack, a cone carried by said shaft, and an operative connection extending between said frame and said cone, said connection comprising a lower spring controlled lever adapted to engage said cone, a vertical rod attached at its lower end to said lever, and an upper arm or lever connecting the upper end of said rod with said swinging frame or cage substantially as and for the purpose specified.

26. In apparatus for measuring and dispensing petrol and other liquids, the combination of a measuring chamber, having a serve or discharge valve, a frame or cage mounted to swing about a vertical axis within said measuring chamber, a float adapted to rise and fall on said frame or cage, a meter or counter device, a vertical rocking spindle adapted to actuate said meter or counter on successive rocking movements of said spindle, a series of vertically spaced pins or studs carried by said rocking spindle, means adapted to automatically swing said frame or cage and said float bodily about the axis of said frame whereby the float is disposed in an inoperative position relative to said rocking spindle when said discharge valve is closed, and oppositely inclined fins or projections carried by said float and adapted to engage the pins on said rocking spindle to thereby rock the latter in opposite directions, as the float falls during the discharge of the liquid from the measuring chamber by way of said discharge valve, substantially as and for the purpose specified.

27. In apparatus for measuring and dispensing petrol and other liquids, the combination of a measuring chamber, a series of independent liquid supply pipes passing to said chamber, an inlet valve separately controlling the admission of liquid through each of said supply pipes to the measuring chamber, a vertically adjustable overflow tube passing into said chamber, a distributary drain valve connected with said overflow tube, a series of drain pipes leading from said drain valve, means for selectively operating said inlet and drain valves whereby a corresponding supply pipe and drain pipe may be simultaneously opened to the measuring chamber to the exclusion of the other of said pipes, and a small return tube connecting the upper part of each liquid supply pipe with the corresponding drain pipe, substantially as and for the purpose specified.

In testimony whereof I affix my signature.

LOUIS HENRI PIETZSCH.